US00RE37244E

(19) United States
(12) Reissued Patent
Tanimizu et al.

(10) Patent Number: US RE37,244 E
(45) Date of Reissued Patent: Jun. 26, 2001

(54) INSULATED TYPE SWITCHING DEVICE

(75) Inventors: Tooru Tanimizu; Masayoshi Hayakawa; Fumio Shibata; Masato Kobayashi; Satoru Kajiwara; Masatoshi Morita; Ayunu Morita, all of Hitachi (JP)

(73) Assignee: Hitachi, Ltd., Tokyo (JP)

(21) Appl. No.: 09/239,546

(22) Filed: Jan. 29, 1999

Related U.S. Patent Documents

Reissue of:
(64) Patent No.: 5,719,365
Issued: Feb. 17, 1998
Appl. No.: 08/714,425
Filed: Sep. 16, 1996

(30) Foreign Application Priority Data

Sep. 27, 1995 (JP) ..... 7-249076
Sep. 27, 1995 (JP) ..... 7-249078

(51) Int. Cl.[7] ..... H01H 33/66
(52) U.S. Cl. ..... 218/118; 218/140
(58) Field of Search ..... 218/118, 120, 218/123, 140, 141, 142

(56) References Cited

U.S. PATENT DOCUMENTS 4,486,634 * 12/1984 Nakano et al. ..... 200/145 R
4,879,441 11/1989 Hamm et al. .
5,422,450 * 6/1995 Miyazawa et al. ..... 218/140
5,512,724 * 4/1996 Binder et al. ..... 218/140
5,591,948 * 1/1997 Bolongeat-Mobleu et al. ..... 218/68

FOREIGN PATENT DOCUMENTS 41 03 101 9/1991 (DE) .
011 972 6/1980 (EP) .
451 963 8/1936 (GB) .
1 255 383 12/1971 (GB) .
1 329 725 9/1973 (GB) .
55-143727 * 11/1980 (JP) .
59-75527 4/1984 (JP) .
3-273804 * 12/1991 (JP) .

* cited by examiner

*Primary Examiner*—Matthew Nguyen
(74) *Attorney, Agent, or Firm*—Mattingly, Stanger & Malur, P.C.

(57) ABSTRACT

In an insulated type switching device, during rotation of a movable conductor 19 around a pivotal axis 35 between a stationary conductor 16 and a ground conductor 17 all of which are disposed in a vacuum vessel 12, the movable conductor 19 uninterruptedly takes four positions of closing position $Y_1$, opening position $Y_2$, disconnecting position $Y_3$ and grounding position $Y_4$, thereby a series of switching operations can be performed uninterruptedly, the operation and handling thereof are facilitated as well as the size of the insulated type switching device is reduced.

29 Claims, 9 Drawing Sheets

INSULATED TYPE SWITCHING DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an insulated type switching device in which at least one of a circuit breaker, a disconnecting switch, a load break switch and a grounding switch is collectively used.

2. Description of the Prior Art

In an electric power receiving and transforming substation, generally an electric power from, for example, an electric power generating company is received via a disconnecting switch and a circuit breaker and the received electric power is supplied to a load, for example, a motor, after the voltage of the received electric power is transformed to a proper voltage for the load. In order to perform maintenance and inspection of the machines and apparatus in such electric power receiving and transforming substation, after interrupting the circuit breaker, the disconnecting switch is opened which is provided separately from the circuit breaker and then the grounding switch is grounded, thereby possible residual electric charges at the power source side and induction current are flowed to the ground as well as voltage reapplication from the power source is prevented, and thus the safety of maintenance and inspection workers is kept. Further, when the grounding switch is grounded while the bus is kept charged, an accident is caused, therefore for preventing such accident an interlock arrangement is provided between the disconnecting switch and the grounding switch.

For example, in a gas insulated switching device as disclosed in JP-A-3-273804(1991), a circuit breaker, two disconnecting switches and a ground switch which are separately manufactured are received in a switch box including insulating gas filled unit chamber and bus chamber, wherein a vacuum circuit breaker is used for the circuit breaker and the movable contact of the vacuum circuit breaker is moved in vertical direction with respect to the stationary contact thereof by means of an actuating mechanism to perform the making and interrupting functions. On the other hand, in the vacuum circuit breaker disclosed in JP-A-55-143727(1980) the movable contact is designed to rotate in left and right directions around the pivotal main shaft thereof so as to perform the making and interrupting functions through opening and closing operations with respect to the stationary contact. In order to perform maintenance and inspection of the machines and apparatus in such electric power receiving and transforming substation, after interrupting the circuit breaker, the disconnecting switch is opened which is provided separately from the circuit breaker and then the grounding switch is grounded, thereby possible residual electric charges at the power source side and induction current are flowed to the ground as well as voltage reapplication from the power source is prevented, and thus the safety of maintenance and inspection workers is kept. After completing the maintenance and inspection work, the grounding switch is at first opened, thereafter the circuit breaker has to be closed. However, in the conventional switching device such series of operations can not be uninterruptedly performed, the respective operations are not easily performed and further the respective switches can not be easily handled.

Further, since the circuit breaker, the two disconnecting switches and the grounding switch are respectively arranged separately, such arrangement makes the entire size thereof large, makes the operation thereof difficult and may cause a possible erroneous operation. Further, when the grounding switch is grounded while the bus is kept charged, an accident is caused, therefore for preventing such accident an interlock arrangement which is complex and strong is provided between the disconnecting switch and the grounding switch, such interlock arrangement limits the arrangement of machines and apparatus therein which further increases the size of the entire device.

SUMMARY OF THE INVENTION

An object of the present invention is to provide an insulated type switching device which permits a series of operations to be performed uninterruptedly and further permits easy handling thereof and the size reduction thereof.

Another object of the present invention is to provide an insulated type switching device which reduces the necessary operating force of the operating mechanism therefor by making use of an electromagnetic force generated therein and further permits the size reduction thereof.

An insulated type switching device according to the present invention comprises a stationary conductor and a grounding conductor which are disposed in an opposing relation in a vacuum vessel and a movable conductor disposed in the vacuum vessel between the stationary conductor and the grounding conductor so as to permit rotation thereof around a pivotal shaft therefor to perform the opening and closing operations thereof with respect to the stationary conductor and the grounding conductor and one end of the movable conductor is extended out of the vacuum vessel, wherein the movable conductor takes four positions of closing position, opening position, disconnecting position and grounding position uninterruptedly during the movement thereof from the stationary conductor to the grounding conductor.

DESCRIPTION OF PREFERRED EMBODIMENTS

Figure 1:
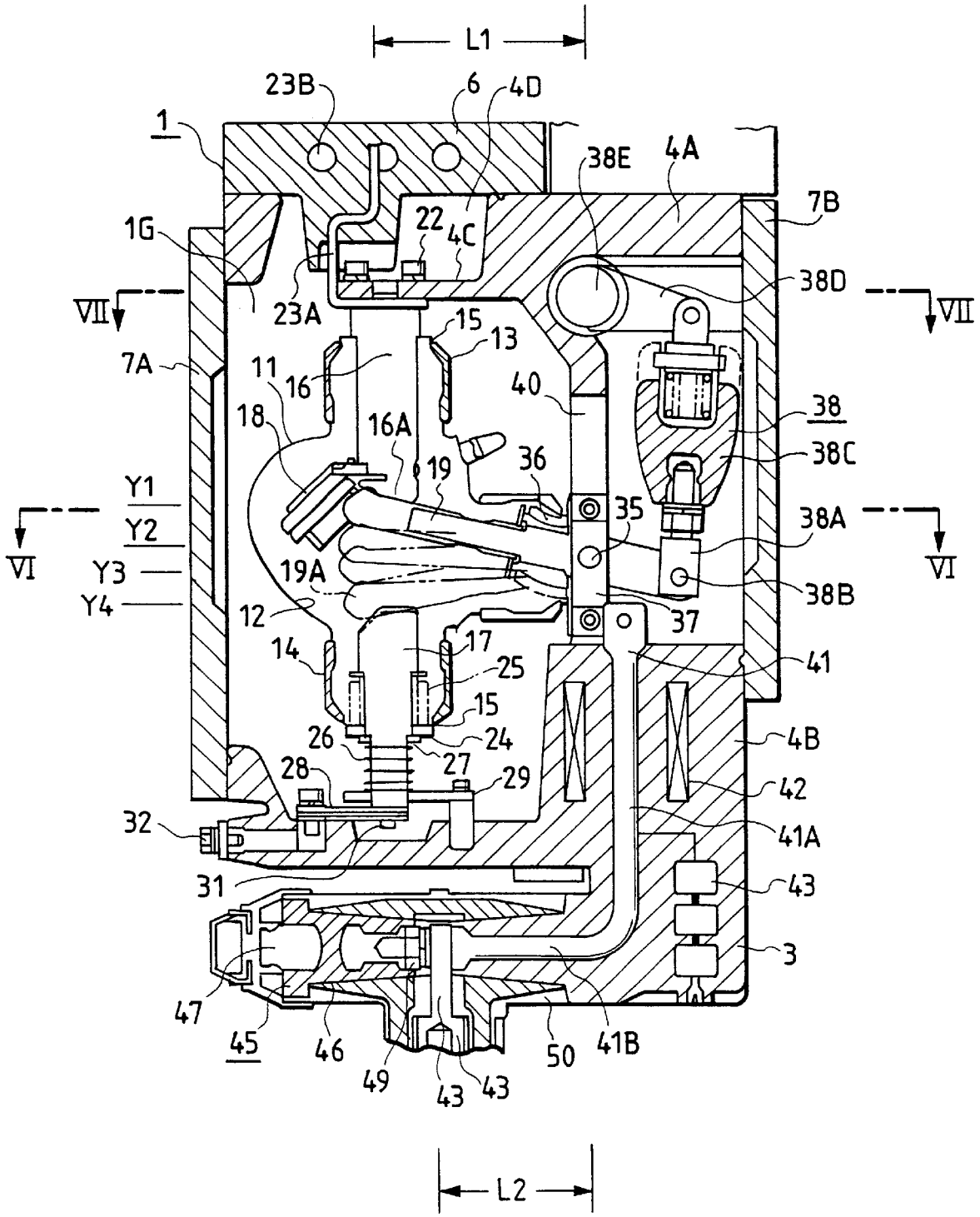
FIG. 1 is a side cross sectional view of an insulated type switching device representing one embodiment according to the present invention.
Figure 2:
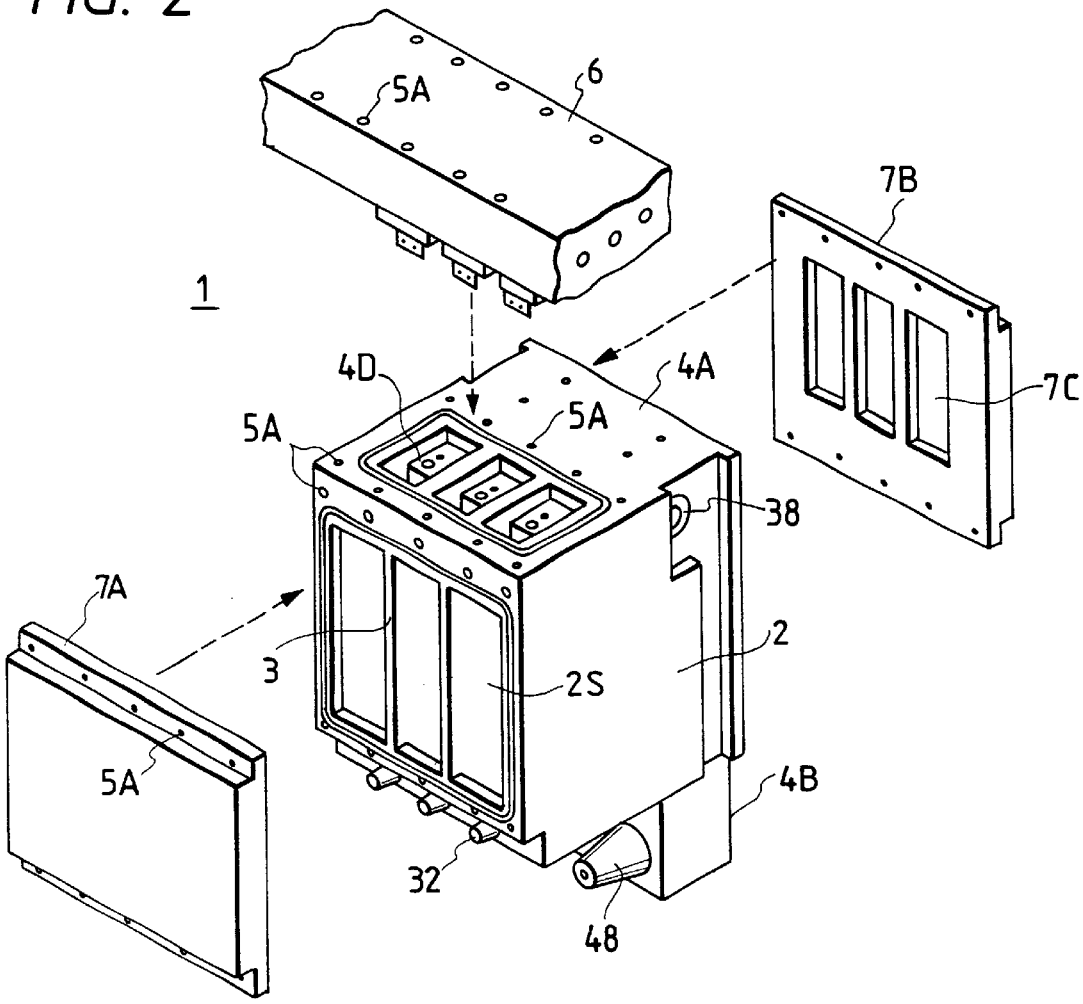
FIG. 2 is an exploded perspective view of an insulating gas container used in FIG. 1.
Figure 3:
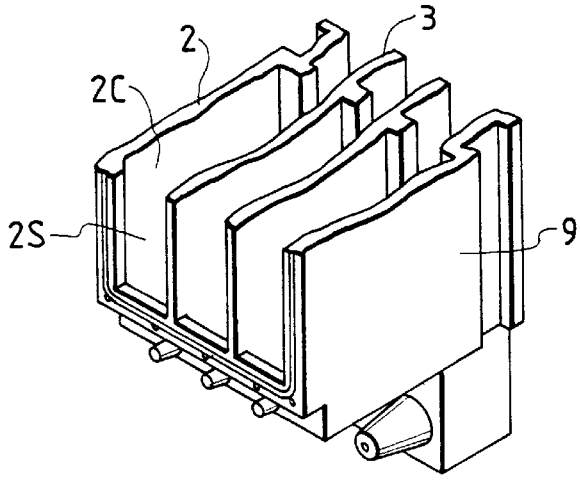
FIG. 3 is a perspective view of a part of the insulating gas container used in FIG. 1.
Figure 4:
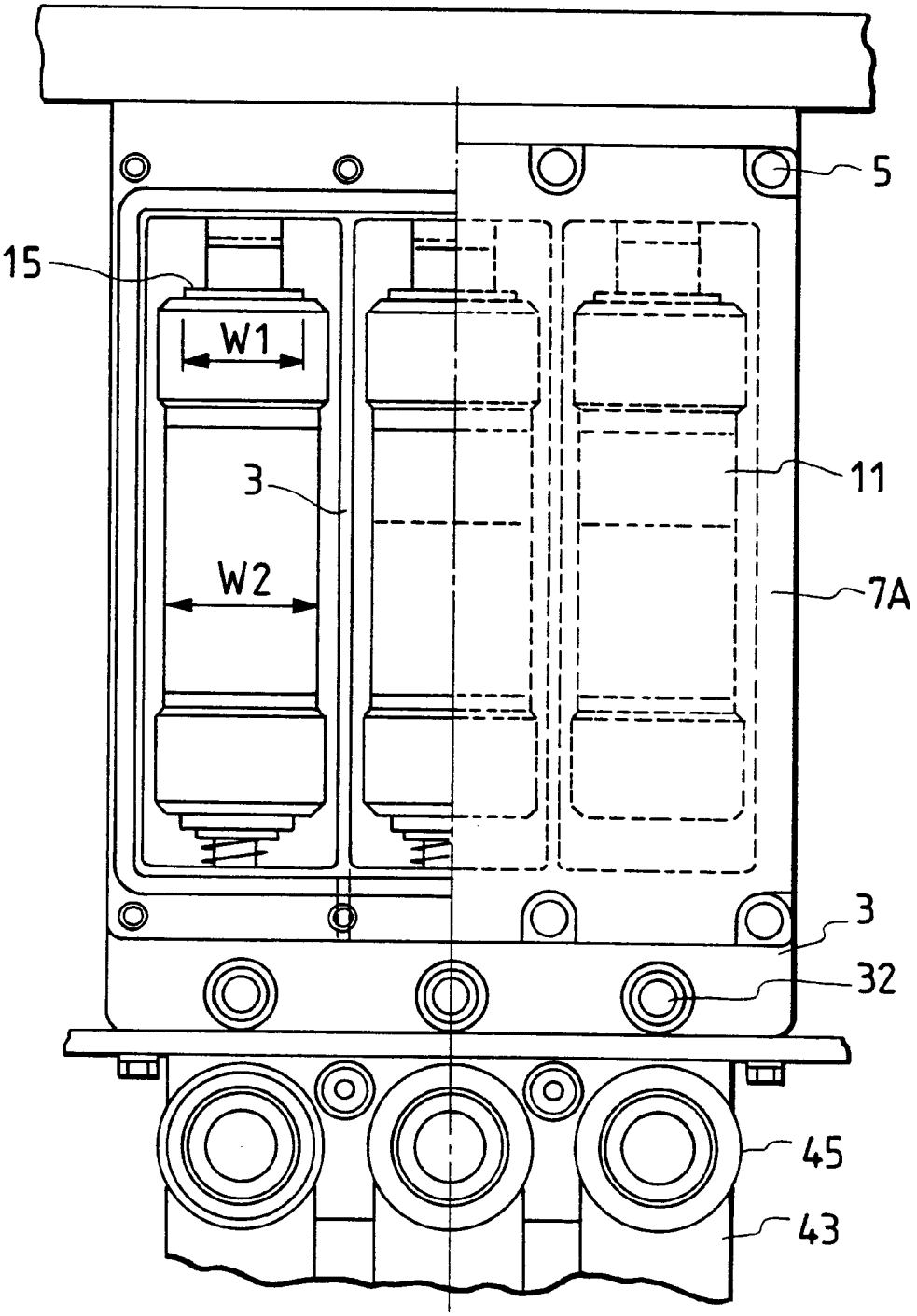
FIG. 4 is a front view when viewing FIG. 1 from the left side thereof.
Figure 5:
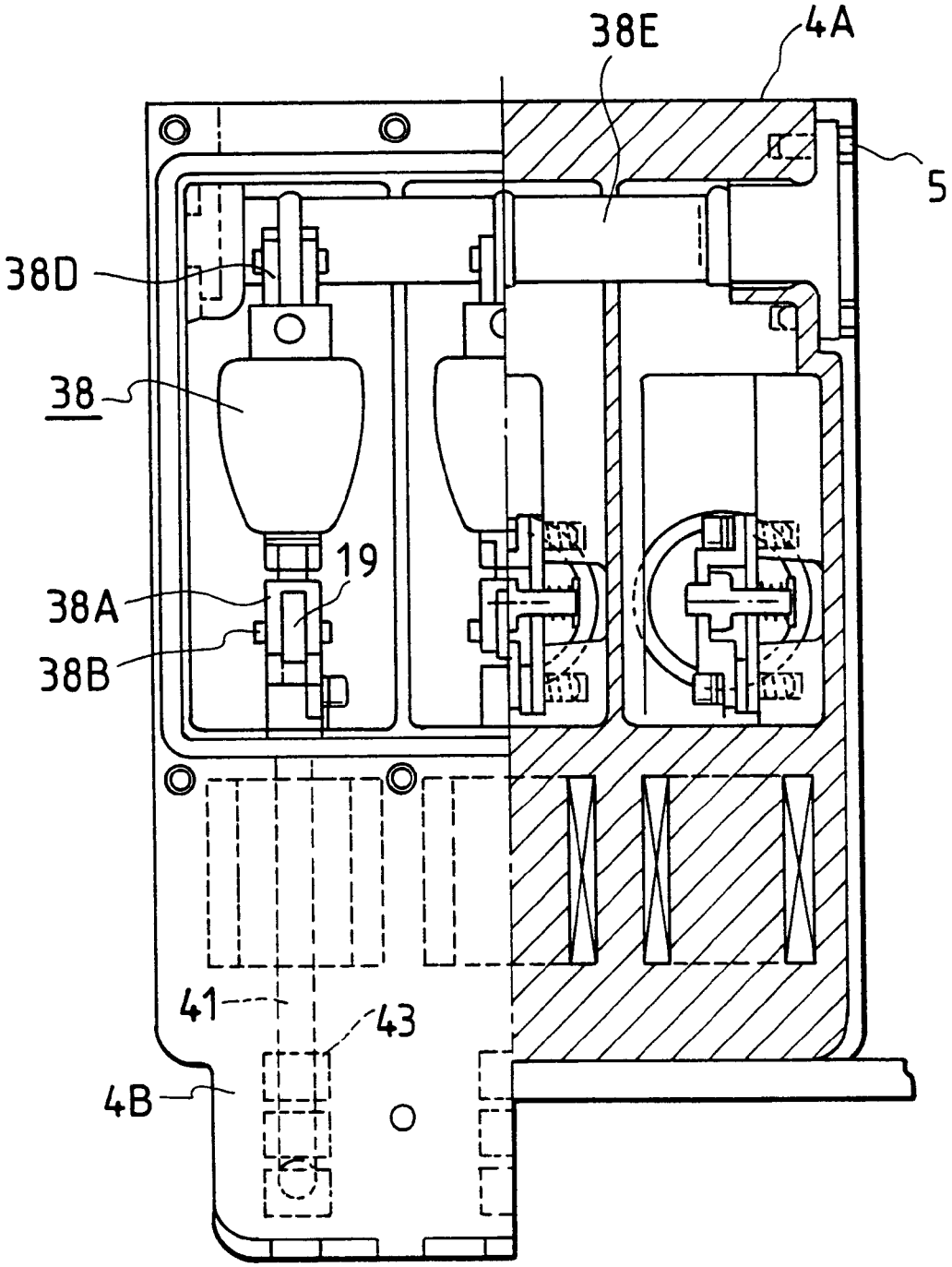
FIG. 5 is a front view when viewing FIG. 1 from the right side thereof.
Figure 6:
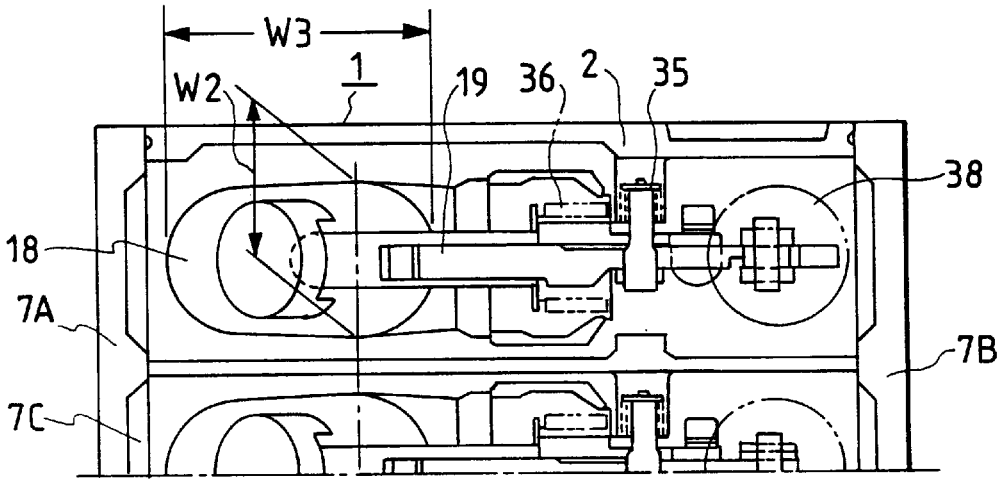
FIG. 6 is a cross sectional view taken along the line VI—VI in FIG. 1.
Figure 7:
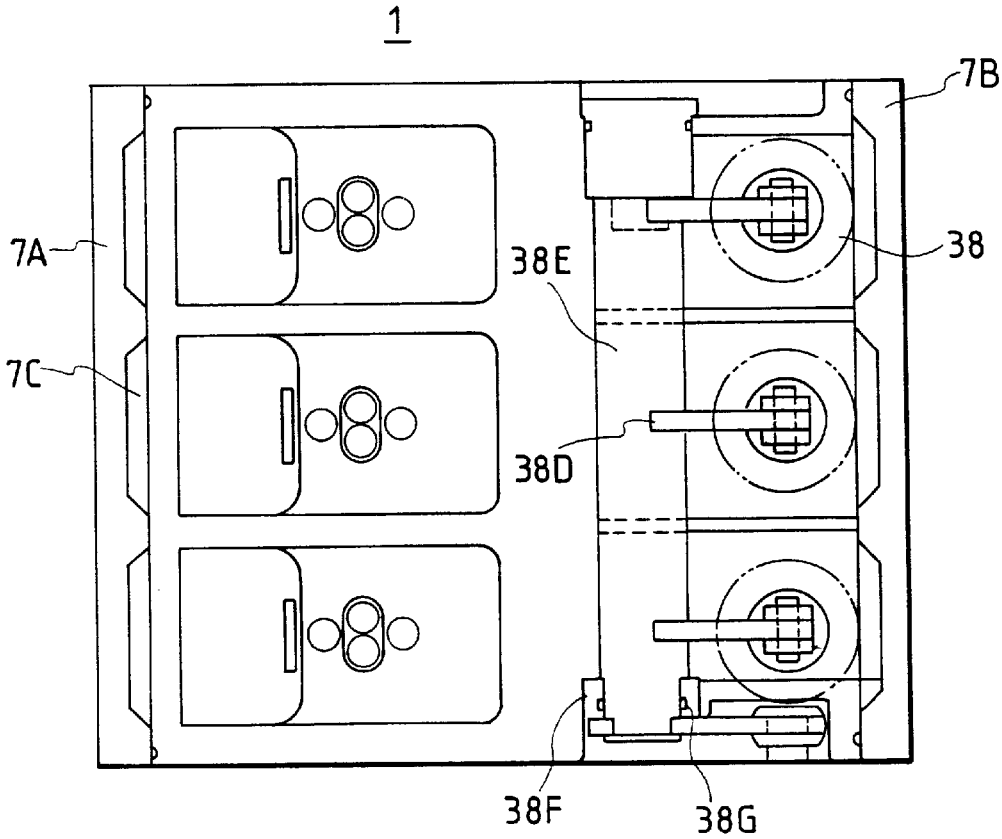
FIG. 7 is a cross sectional view taken along the line VII—VII in FIG. 1.

Hereinbelow, an embodiment of the present invention is explained with reference to FIGS. 1 through 12. FIG. 1 shows an internal structure of the insulated type switching device and FIGS. 2 and 3 show details of an insulating gas container 1 shown in FIG. 1. FIGS. 4 and 5 show outlooks when viewing FIG. 1 from leftward and rightward respectively. FIGS. 6 and 7 are respectively cross sectional views taken along the lines VI—VI and VII—VII. FIGS. 8 through 12 will be explained later at appropriate portions.

Now, the insulated type switching device is explained with reference to primarily FIGS. 1 through 4. The insulating gas container 1 in which a vacuum switch 11 is disposed is filled with an insulating gas 1G such as $SF_6$ gas and constituted in the following manner. An insulator container body 2 having three vacuum switch receiving chambers 2S defined by two insulator partition plates 3 is integrally molded by epoxy resin. Through provision of a stationary insulator plate 4A and a main body insulator plate 4B at the top and bottom sides of the insulator container main body 2 substantially a rectangular shaped hollow casing is formed. The stationary insulator plate 4A is provided with three opening portions 4D through which three phase bus bars are led and on which bus insulator plates 6 are detachably mounted. At the front and back faces of the insulator container main body 2 in a form of hollow casing a front side insulator cover 7A and a back side insulator cover 7B are detachably secured respectively by fastening screws 5. Thereby, the insulating gas container 1 filled therein with insulating gas 1G in gas tight manner is constituted.

Through the provision of a grounding layer 9 on the outer surface of the insulating gas container 1, the dielectric break down voltage of the insulating gas container 1 is increased and the size thereof is reduced. Further, even when the dielectric strength is reduced because of leakage of the insulating gas, the so called double insulation structure including the insulator partition plates 3 maintains a required insulating property, thereby, propagation of possible failure is prevented and a safety is maintained. When the fastening screws 5 are removed and both insulator covers 7A and 7B are detached, the respective vacuum switches 11 can be positioned easily either from the front side or the back side in the corresponding receiving chambers 2S defined by the insulator partition plates 3, thereby the efficiency of the assemblying and disassembling works thereof is significantly improved. Since the dielectric constant of both insulator covers 7A and 7B is different from that of the insulating gas 1G, if the insulating distance in the insulated type switching device is limited, a corona discharge is likely caused, therefore recessed portions 7C are formed on the inner face of the insulating gas container 1 where the vacuum switch 11 and an operating mechanism portion 38 locate close, thereby an electric field concentration is relaxed and a possible corona discharge is prevented. Numeral 5A are screw insertion holes.

The inside of the vacuum switch 11 as shown in FIGS. 1 and 4 through 7 is evacuated. The vacuum switch 11 is provided with a metal casing 12 and insulating bushings 13 and 14 of ceramic member which project at the top and bottom sides of the metal casing 12. Stationary conductor 16 and a grounding conductor 17 are respectively secured to the top side insulating bushing 13 and the bottom side insulating bushing 14 via corresponding sealing metal members 15 provided respectively at the outer sides of the top side insulating bushing 13 and the bottom side insulating bushing 14. Further, between both the stationary conductor 16 and the grounding conductor 17 and both left and right sides in the vacuum switch 11 an arc extinguishing arrangement 18 and a movable conductor 19 are provided. Thereby, the vacuum switch 11 is configurated substantially in a cross shape. The sealing metal members 15 having width $W_1$ through which stationary conductor 16 having a small cross sectional area passes, is applied of an entire voltage. Therefore, it is required to provide for the sealing metal members 15 a sufficient dielectric distance with respect to surroundings thereof. The portion of the metal casing 12 having width $W_2$ and covering the large arc extinguishing arrangement 18 is only applied of an intermediate voltage, less than the voltage applied to the sealing metal members 15 having the width $W_1$. Therefore, the dielectric distance therefor can be short. $W_3$ is a length measured from the contacting point between a movable contact 19A and a stationary contact 16A to the outer wall of the metal casing 12 as illustrated in FIG. 6.

In case of disposing these vacuum switches 11 in three phases, the vacuum switches 11 are disposed in parallel in such a manner that the respective projecting movable conductors 19 are aligned in parallel at the same side as illustrated in FIGS. 4 through 7, thereby the metal casings 12 requiring less dielectric distance are disposed more closely and the sealing metal mumbers 15 requiring more dielectric distance are disposed comparatively remote from each other and the space between the adjacent vacuum switches is optimized, thereby the installation area for the three phase vacuum switches is accordingly reduced.

At the top end of the stationary conductor 16 the stationary contact 16A composed of a high melting point metal member such as Pb—Cu alloy is provided. The stationary conductor 16 extends from the inside of the vacuum switch 11 to the outside thereof and is connected at the outside to a bus side conductor 23A. The stationary conductor 16 is secured to a supporting portion 4C of the stationary insulator plate 4A through a bolt fastening. The bus side conductor 23A is connected to bus conductors 23 in the bus insulator plate 6. Namely, the bus insulator plate 6 is formed by molding insulator resin such as epoxy so as to integrate the bus side conductor 23A and the bus conductor 23B.

A bellows 25 is provided between the inner diameter side of the sealing metal member 15 secured to the bottom side bushing 14 and the grounding conductor 17, and the grounding conductor 17 is supported by an insulator guide 24 and a stationary guide 29 and is permitted to move in the axial direction in response to contacting force by the movable conductor 19 while the movement is being limited by a spring 26. The grounding conductor 17 is also provided with a stopper plate 27 for the spring 26 and a copper plate 28 formed by a plurality of thin copper sheets is fastened and secured at the projecting end of the grounding conductor 17 by a fitting in a grounding nut 31. Accordingly, when the movable conductor 19 pushes the grounding conductor 17 during grounding operation, the movable conductor 19 and the grounding conductor 17 contact each other with the pressing force and the reaction force exerted by the spring 26, thereby the grounding current flows to an external grounding terminal via the copper plate 28. Since the external grounding terminal is designed so as to project in the opposite direction from that of the movable conductor 19, a grounding cable can be connected to the external grounding terminal 32 without being interfered with by the projecting end of the movable conductor 19 which facilitates attaching and detaching works thereof.

The movable conductor 19 which is extended in perpendicular direction with respect to the line connecting between the stationary conductor 16 and the grounding conductor 17 is designed to rotate or pivot between the stationary conductor 16 and the grounding conductor 17 around the main axial shaft 35 to perform the open and close operation therewith. When the movable contact 19A separates from the stationary contact 16A, an arc is generated therebetween and in the arc blow-out direction an arc extinguishing arrangement 18 is provided.

Figure 8:
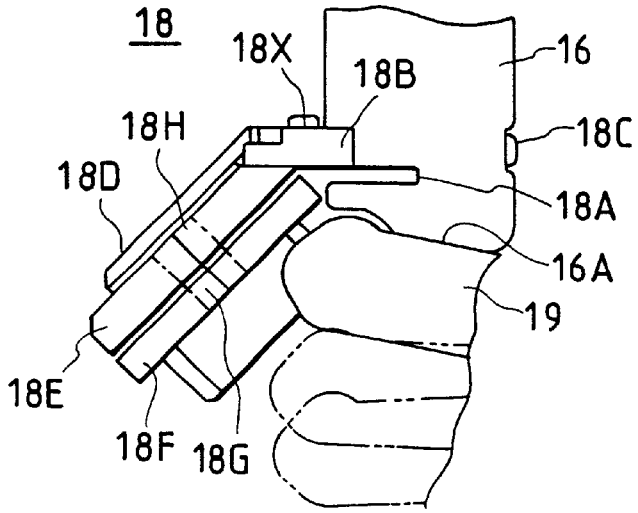
FIG. 8 is a detailed view showing an arc extinguishing arrangement used in FIG. 1 and the vicinity therearound.

The arc extinguishing arrangement 18 is secured on the stationary conductor 16 in the following manner. As illustrated in FIG. 8, an attachment metal member 18B is fitted into an attachment groove formed by cutting in the one side of the stationary conductor 16 and is secured by fastening a screw 18C, and the arc extinguishing arrangement 18 and a shield 18D are attached to the attachment metal member 18B by a screw 18X. The arc extinguishing arrangement 18 is easily attached or detached around the outer circumference of the stationary conductor 16 and the movable conductor 19 by simply making use of screws 18C and 18X.

The arc extinguishing arrangement 18 is constituted by a coil electrode 18E and a main electrode 18F disposed between the shield 18D and the movable conductor 19. The coil electrode 18E and the main electrode 18F are connected by a connecting portion 18H and both provided with respective through-holes 18G at the center thereof and respective cut-out grooves extending from the outer circumference thereof to the respective through-holes.

Figure 9:
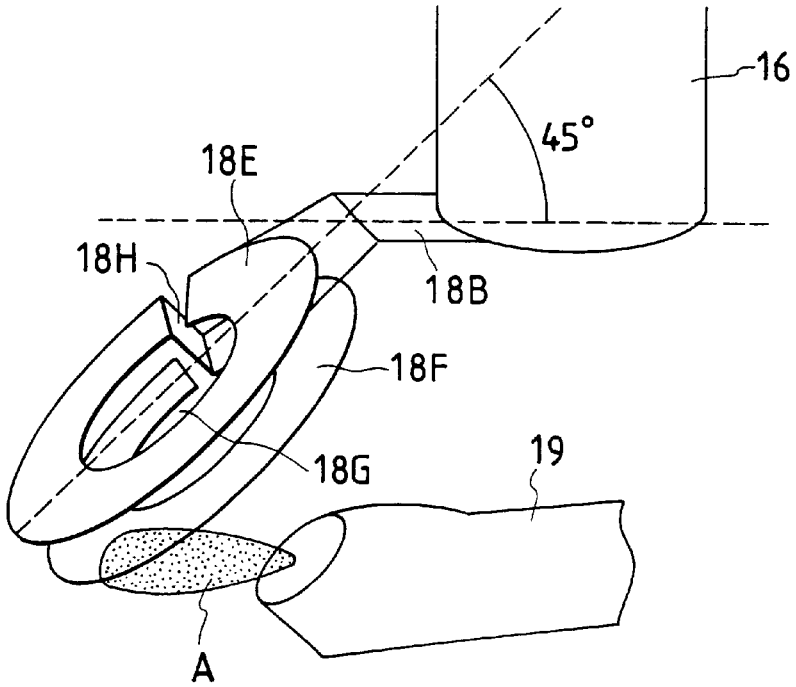
FIG. 9 is a schematic view of electrodes in the arc extinguishing arrangement in FIG. 8 for explaining arc extinguishing function thereof.
Figure 10:
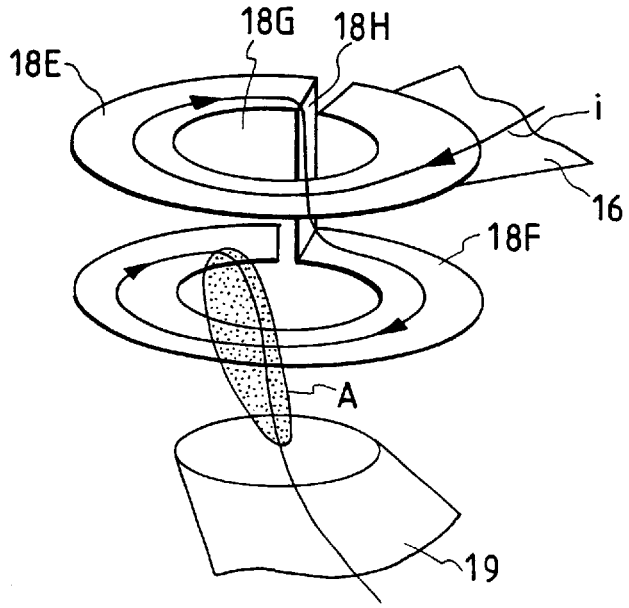
FIG. 10 is a schematic view of electrodes in another arc extinguishing arrangement for explaining the arc extinguishing function thereof.

When the movable contact 19A provided at a part of the movable conductor 19 is separated from the stationary contact 16A, an arc A is generated between both contacts as illustrated in FIGS. 9 and 10, and when the movable contact 19A comes near the through-hole 18G, the arc current flows along the circumferences of the coil electrode 18E and the main electrode 18F. The magnetic field induced by the arc current shows a vertically oriented magnetic field near at the through-holes 18G and a loop shaped magnetic field at around the circumferences of both electrodes [1BE] *18E* and 18F. The vertically oriented magnetic field works to scatter the arc and to extinguish the same, and the loop shaped magnetic field works to drive the arc along the circumference of the main electrode 18F and to extinguish the same, thereby, the current interrupting capacity of the thus constituted vacuum switch 11 is significantly improved.

The movable conductor 19 is extended from the inside of the vacuum switch 11 to the outside thereof and at the intermediate portion thereof passes through a bellows 36. With the provision of the bellows 36, the movable conductor 19 is permitted to rotate in up and downward directions in vacuum tight condition and to move the movable contact 19A provided at the end of the movable conductor 19 between the stationary contact 16A and the grounding conductor 17. The material of the movable contact 19A is as same as that of the stationary contact 16A such as Pb-Cu alloy as mentioned above. The bellows 36 is likely secured with the sealing metal member 15. The movable conductor 19 is sandwiched between a pair of connecting conductors 37 and with a main axial shaft 35 which is inserted into through-holes provided at both conductors 19 and 37 and one threaded end of which is fastened by a fastening member of nut, the movable conductor 19 is rotatably supported by the connecting conductors 37.

Figure 11:
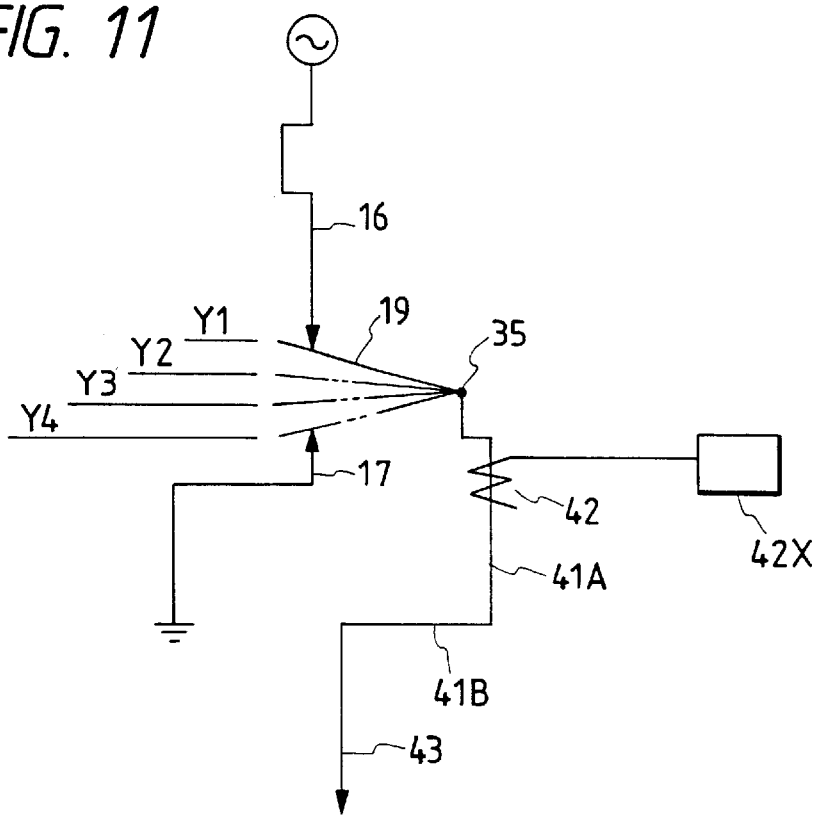
FIG. 11 is an equivalent circuit of FIG. 1 for explaining the operation of the movable conductor.

The movable electrode 19 can take four positions as illustrated in FIG. 11, when the movable conductor 19 is rotated in up and down directions around the pivotal main axial shaft 35 through actuation of the operating mechanism 38 coupled with the outer end of the movable conductor 19. Namely, depending on advancement of the rotation of the movable conductor 19, the movable conductor 19 takes a making position Y1 where the movable contact 19A contacts to the stationary contact 16A, a interrupting position Y2 where the movable conductor 19 is rotated downward from the making position to interrupt current flowing between the stationary conductor 16 and the movable conductor 19, a disconnecting position Y3 where the movable conductor 19 is further rotated downward to maintain a predetermined dielectric distance which withstands a possible invading lightning surge and a grounding position Y4 where the movable conductor 19 is further rotated to contact with the grounding conductor 17.

These respective positions can be achieved uninterruptedly with a small movement during the rotation of the movable conductor 19 between the stationary conductor 16 and the grounding conductor 17 in vacuum environment having a higher insulating property than $SF_6$ gas, thereby the operation and handling of the insulated type switching device are simplified as well as the size thereof is reduced in comparison with the above explained conventional device, because the movable contact 19A, the stationary contact 16A and the grounding conductor 17 are collected into one place. Further, as explained above, when vacuum leakage happens in the vacuum switch 11, dielectric property thereof is reduced and the stationary conductor 16 is grounded via an arc discharge, the grounding discharge current is detected by a current transformer 42 to cause to operate a protective relay 42X which trips the operating mechanism 38 so as not to operate the movable conductor 19, thereby, break-down of the vacuum switch 11 is prevented.

The movable conductor 19 and the operating mechanism 38 are coupled by inserting a pin [38] *38B* provided at the end of the movable conductor 19 into an insertion hole provided at a U shaped metal member 38A of the operating mechanism 38, the U shaped metal member 38A is secured at one end of an insulator operating rod 38C and the other end of insulator operating rod 38C is coupled with an operating lever 38D which is secured to a rotatable shaft 38E, of which operating levels of respective phases are secured. These mechanical structures of the operating mechanism 38 are well known in the art, therefore detailed explanation thereof is omitted.

Since a bearing 38F for the rotatable shaft 38E is formed by molding together with the stationary insulator plate 4A as illustrated in FIGS. 5 and 7, the sealing structure is achieved only by one O ring disposed in a recessed portion 38G provided along the inner wall face of the bearing 38F. Contrary, in the conventional art, the bearing 38F was not integrally molded with the stationary insulator plate, two O rings are necessary at the bearing which complexes the structure and requires more time for the assembly in comparison with the present embodiment.

First ends of the connecting conductors 37 are connected to a supporting plate 40 which is integrally secured to the stationary insulator plate 4A and the other ends of the connecting conductors 37 are connected to a load side conductor 41. The current transformer 42 and a capacitor 43 which are integrally molded within the main body insulator plate 4B are coupled to the load side conductor 41. When the current transformer 42 detects such as a fault current and a grounding current caused by abnormal vacuum condition in the vacuum switch 11 both flowing through the load side conductor 41, the protective relay 42X is operated to activate the trip mechanism in the operating mechanism 38, thereby, the operating mechanism 38 is released and the movable conductor 19 is rotated downward to separate the movable contact 19A from the stationary contact 16A and to complete the interruption. Further, the capacitor 43 divides the voltage of the main circuit, fetches the voltage and phase of the main circuit and determines electric power flow condition and the direction of [grouning] *grounding* fault at a detecting unit (not shown). According to the present embodiment, when an abnormal vacuum condition happens in the vacuum switch 11, the dielectric property in the vacuum switch 11 reduces and the vacuum switch 11 is grounded via an arc discharge which is detected by the protective relay 42X and is countermeasured thereby. Such was not easily performed by the conventional art.

Further, the load side conductor 41 in the main body insulator plate 4B is configurated in a L shaped current carrying conductor and includes a vertical conductor portion 41A extending in parallel with the axis of the vacuum switch 11 and a bent conductor portion 41B extending toward the side of the contacting point between the movable contact 19A and the stationary contact 16A, and the bent conductor portion 41B is connected at the end thereof to a cable head 45 and to a load side cable 43.

In the cable head 45, the end of the load side cable 43 is clamped to the threaded end face of the bent conductor portion 41B by a fastening nut 49, and when an adjusting screw head 47 supported by an insulator holding portion 46 is rotated, the insulator holding portion 46 is correspondingly pressed and expanded outwardly, and an insulator rubber cover 50 surrounding the adjusting screw 47, the fastening nut 49 and the end of the load side cable 43 is also pressed, thereby the insulator holding portion 46 and the insulator rubber cover 50 are closely contacted with each other to eliminate gaps therebetween so that water does not invade into the inside thereof and the dielectric breakdown strength at the cable head 45 is significantly improved. However, such structure is also well known in the art, therefore, further detailed explanation thereof is omitted.

Figure 12:
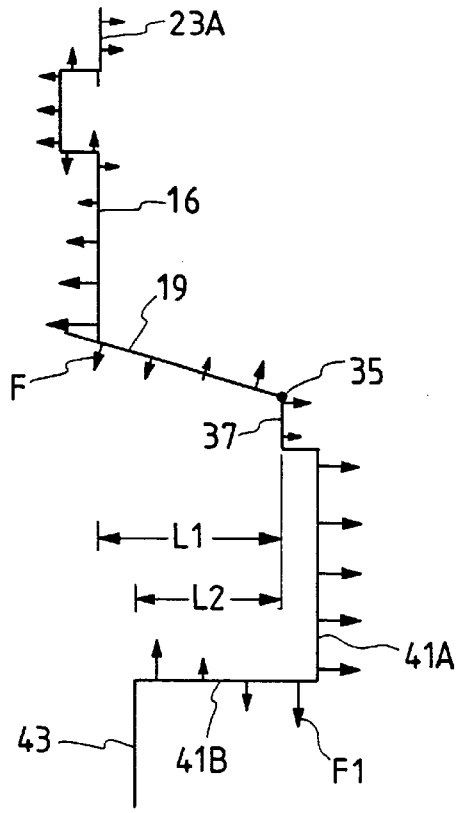
FIG. 12 is a circuit for explaining electromagnetic forces generated in the insulated type switching device in FIG. 1.

Now, electromagnetic forces caused by the current flowing from the bus side conductor 23A to the load side cable 43 in the insulated type switching device according to the present embodiment acts outwardly on all of L shaped conductors in the current passage. In the present embodiment the electromagnetic forces F acts on the movable conductor 19 as illustrated in FIG. 12. The electromagnetic force F acting on the movable conductor 19 is determined by subtracting a electromagnetic force F1 generated by addition of the bent conductor portion 41B which constitutes an inverted C shaped current passage together with the movable conductor 19 and the vertical conductor portion 41A from the outwardly directing electromagnetic force commonly generated at around the L shaped conductor constituted, in this instance, by stationary conductor 16 and the movable conductor 19.

[Conventionary] *Conventionally*, the operating mechanism 38 is required to maintain the making condition and to continue current conduction even if a large outwardly directing electromagnetic force is caused on the movable conductor such as by a short circuiting current flow therethrough, therefore, the conventional operating mechanism is required to exert a large contacting force for contacting the movable contact onto the stationary contact which causes to increase the size thereof.

In the present embodiment, a part of the outwardly directing electromagnetic force acting on the movable conductor 19 is canceled by the electromagnetic force $F_1$ which is generated by the addition of the bent conductor portion 41B and is directed to opposite direction to the outwardly direct electromagnetic force around the L shaped conductor, therefore, the required actuating force for the operating mechanism 38 is reduced and the operating mechanism 38 is only required to exert a minimum contacting force allowing a normal current conduction on the stationary conductor 16 and the grounding conductor 17 via the movable conductor 19, thereby the actuating force required for the operating mechanism 38 is greatly reduced and the size and weight of the operating mechanism 38 according to the present embodiment are also reduced in comparison with those of the conventional operating mechanism.

Now, the length of the inverted bent portion 41B is discussed. When assuming that the length of the movable conductor 19 in horizontal direction from the pivotal main axial shaft 35 to the contacting position between the movable contact 19A and the stationary contact 16A is as $L_1$ and the length of the inverted bent portion 41B in horizontal direction from the pivotal main axial shaft 35 to the connecting point with the end terminal of load side cable 43 is as $L_2$, and further assuming that $L_1=L_2$, the electromagnetic force acting outwardly at the movable contact 19A and the electromagnetic force acting in an opposite direction at the movable contact 19A caused by adding the inverting bent portion 41B balance each other so that the operating mechanism 38 is only required to apply an operating force which causes the movable contact 19A a predetermined contacting pressure on the stationary contact 16A, thereby the required operating force of the operating mechanism 38 is reduced. In other words, the required operating force of the operating mechanism 38 can be varied by adjusting the length $L_2$ of the inverting bent portion 41B which causes to generate the electromagnetic forces acting in opposite direction to the outwardly directing electromagnetic force at the contact point between the movable contact 19A and the stationary contact 16A.

Further, the insulated type switching device according to the present embodiment can be used as a switching device having a single function such as a circuit breaker in which the movable conductor 19 is separated from the stationary conductor 16 up to the interrupting position $Y_2$, a disconnecting switch in which the movable conductor 19 is separated from the stationary conductor 16 up to the disconnecting position $Y_3$ and a grounding switch in which the movable conductor 19 is permitted to contact to the grounding conductor 17. Further, the vacuum switch 11 can be used without disposing in the insulating gas filled container 1.

Figure 13:
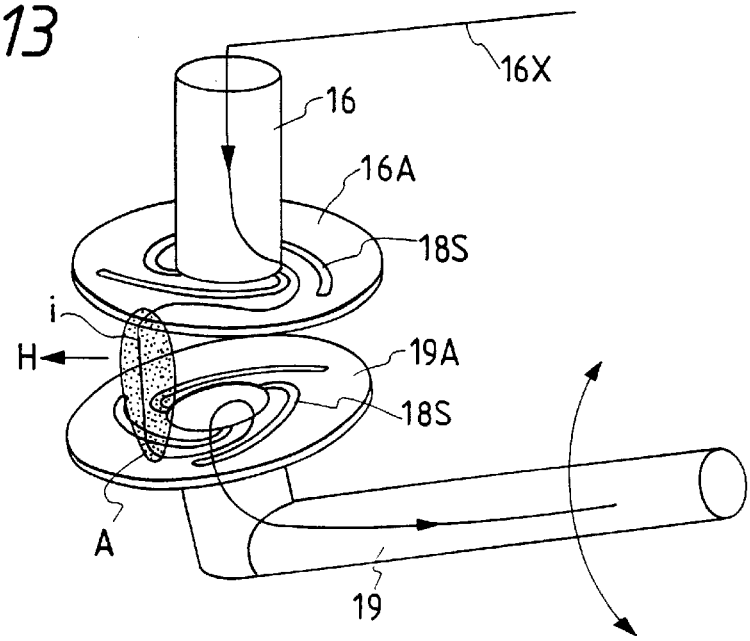
FIG. 13 is a perspective view showing electrodes in a vacuum switch representing another embodiment according to the present invention.

In a vacuum switch 11 as shown in FIG. 13, the movable contact 19A is disposed so as to perform a switching operation with the stationary contact 16A of the stationary conductor 16 through the rotation of the movable conductor 19 carrying the movable contact 19A around the pivotal main axial shaft thereof. Both contacts 16A and 19A are provided respectively with a spiral shaped groove for guiding an arc generated thereon. Since, the stationary conductor 16 and the movable conductor 19 are arranged in a L shape as a whole and current flows through the L shaped current passage, a large electromagnetic field is generated around the both conductors 16 and 19 during when a fault current flows therethrough, therefore, an arc A generated between the movable contact 19A and the stationary contact 16A is forced to blow-out from the electrode faces of both contacts 16A and 19A by the electromagnetic force H induced by the current flowing through the conductors arranged in a L shape and the arcing current i therebetween.

On the other hand, in the present embodiment, when the movable conductor 19 is separated from the stationary conductor 16 to perform a circuit breaking operation, the movable contact 19 is rotated around the pivotal main axial shaft, therefore, the separating distance between the stationary contact electrode 16A and the movable contact electrode 19A at the outer circumference thereof is larger than that between the stationary contact electrode 16A and the movable contact electrode 19A at the inner circumference thereof, thereby the arc A generated therebetween tends to move toward the inner circumference where the arc resistance thereof can be reduced. Namely, an opposite force acts on the arc A which forces the arc A toward the inner circumference of the contact electrodes with respect to the electromagnetic force H which tends to blow-out the arc A from the contact electrodes, thereby the arc A is hardly blown-out from the contact electrodes and a possible damaging of the vacuum switch 11 by impinging the arc A to the wall of the vacuum vessel which improves the current interrupting property of the vacuum switch 11. In particular, when a leading conductor 16X connected to the stationary conductor 16 and arranged in perpendicular thereto is provided and the movable conductor 19 is correspondingly arranged in parallel with the leading conductor 16X, a large electromagnetic force H is generated which forces the arc A to blow-out from the both contact electrode surfaces, therefore through the use of the electrode shaped contacts according to FIG. 13 embodiment, the blow-out of the arc A from the both contact electrode surfaces is effectively prevented while enjoying the advantage obtained by adding the inverting bent portion 41B.

Figure 14:
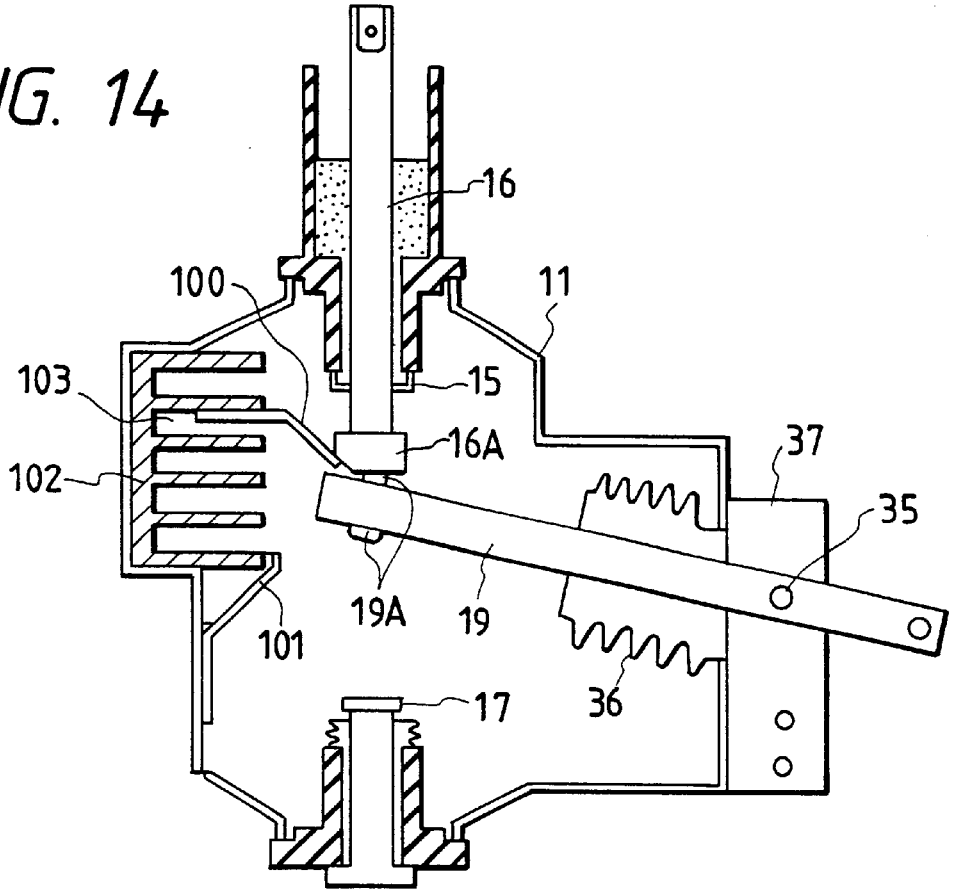
FIG. 14 is a cross sectional view of a vacuum switch with an arc extinguishing arrangement representing still another embodiment according to the present invention.

FIG. 14 shows another vacuum switch having a modified arc extinguishing arrangement 102 in which when the movable conductor 19 is rotated in the counter clockwise direction around the pivotal main axial shaft 35 and is moved to a position corresponding to an arc horn 101, the movable conductor 19 takes an interrupting position, and during the movement of the movable conductor 19 toward the interrupting position, an arc A is generated between the stationary contact 16A and the movable contact 19A, the arc A is shifted between a pair of arc horns 100 and 101 which are nearest from the tops of the movable contacts 19A, bridges the arc horns 100 and 101 received in the arc extinguishing arrangement 102 disposed in the arc blow-out direction and is prolonged in a portion 103 made of ceramic insulating material or zirconia ceramic material having a plurality of projections and recesses of the arc extinguishing arrangement 102 and is extinguished. Accordingly, the arc A is interrupted at the moment when current reaches to zero point so that the conventional current chopping is prevented in which the arc is suddenly interrupted before reaching to a current zero point, thereby the counter measure for preventing an over voltage caused by the conventional current chopping is unnecessitated.

Figure 15:
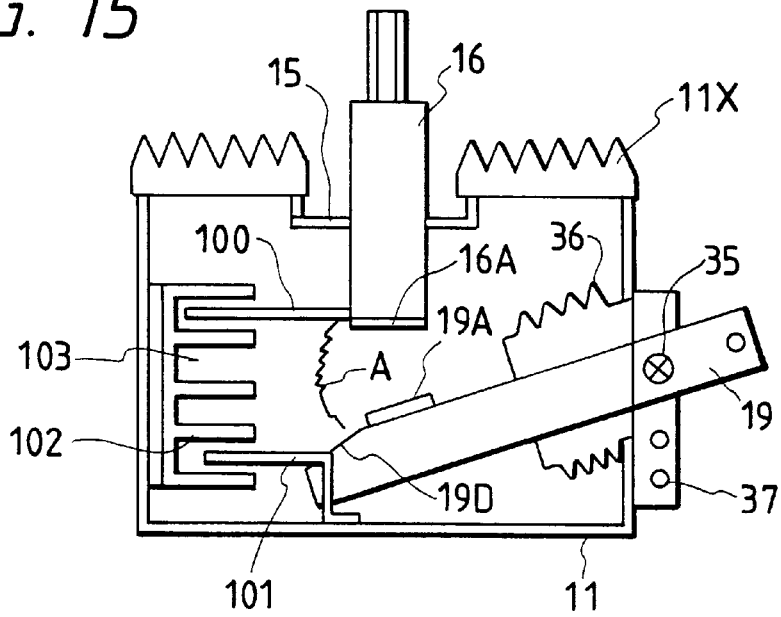
FIG. 15 is a cross sectional view of a vacuum switch with an arc extinguishing arrangement representing a further embodiment according to the present invention.

FIG. 15 is a modification of FIG. 14 embodiment wherein the grounding conductor 17 is eliminated and 11X is a ceramic insulator body having uneven surface and 19D is a movable arcing conductor.

As will be understood from the above explanation, according to the present invention, the following advantages are obtained.

(1) In response to the rotation of the movable conductor 19 the movable contact 19A uninterruptedly takes four positions, in that, closing position, breaking position, disconnecting position and grounding position and causes the movable contact 19A to perform switching operations with the stationary contact 19A and the grounding conductor 17, thereby the operation and handling thereof is facilitated as well as since the movable contact 19A, the stationary contact 16A are collected in one place, the number of constituent parts and the size thereof are reduced in comparison with the conventional device.

(2) With the provision of the inverted bent portion 41B in the load side conductor, a part of the electromagnetic force acting to separate the movable contact 19A from the stationary contact 16A is canceled out, thereby the operating mechanism 38 is only required to provide an operating force to exert a predetermined contacting pressure onto the stationary contact 16A via the movable contact 19A, thereby the size of the operating mechanism 38 according to the present invention is significantly reduced in comparison with the conventional operating mechanism. Accordingly, the size of the insulated type switching device according to the present invention is likely reduced.

(3) The movable conductor 19 having the contact electrode 19A is designed to rotate around the pivotal main axial shaft with respect to the stationary conductor 16 having the contact electrode 16A, an arc generated between the movable and stationary contact electrodes 19A and 16A is forced to move from the outer circumference of the electrode faces to the inner circumference of the electrode faces, a possible impinging of the arc A to the wall of the vacuum vessel is prevented, thereby the current interrupting performance of the vacuum switch is improved. In particular, in a vacuum switch in which the leading conductor 16X is arranged perpendicular to the stationary conductor 16 and the movable conductor 19 is arranged in parallel with the leading conductor 16X, the possible impinging of the arc A to the wall of the vacuum vessel is effectively prevented.

(4) The vacuum switch according to the present invention is provided with an arc extinguishing arrangement, therefore the current interrupting performance of the vacuum switch according to the present invention is significantly improved in comparison with the conventional vacuum switch with no such arc extinguishing arrangement, thereby the size of the insulated type switching device according to the present invention is correspondingly reduced.

(5) When arranging a plurality of the vacuum switches according to the present invention for a plurality of phases, wherein each vacuum switch comprises a stationary conductor and a grounding conductor which are disposed in an opposing relation in a vacuum vessel and a movable conductor disposed in the vacuum vessel between the stationary conductor and the grounding conductor so as to permit rotation thereof around a pivotal shaft therefor to perform the opening and closing operations thereof with respect to the stationary conductor and the grounding conductor and one end of the movable conductor is extended out of the vacuum vessel, the plurality of the vacuum switches are arranged in parallel so that the respective projecting movable conductors align in parallel at the same side, thereby the space between the adjacent vacuum switches is reduced which also reduces installation area of the insulated type switching device according to the present invention.

We claim:

1. An insulated type switching device comprising:

a stationary conductor (16) and a grounding conductor (17) which are disposed in an opposing relation in a vacuum vessel (12) and a movable conductor (19) disposed in said vacuum vessel (12) between said stationary conductor (16) and said grounding conductor (17) so as to permit rotation thereof around a pivotal shaft (35) therefor to perform opening and closing operations thereof with respect to said stationary conductor (16) and said grounding conductor (17) and one end of said movable conductor (19) is extended out of said vacuum vessel (12), wherein said movable conductor (19) takes four positions of closing position $Y_1$, opening position $Y_2$, disconnecting position $Y_3$ and grounding position $Y_4$ uninterruptedly during the movement thereof from said stationary conductor (16) to said grounding conductor (17).

2. An insulated type switching device according to claim 1, characterized in that, said movable conductor (19) takes three positions of closing position $Y_1$, opening position $Y_2$, and grounding position $Y_4$ uninterruptedly during the movement thereof from said stationary conductor (16) to said grounding conductor (17).

3. An insulated type switching device comprising:

a [station] *stationary* conductor (16) and a grounding conductor (17) which are disposed in an opposing relation in a vacuum vessel (12) and a movable conductor (19) disposed in said vacuum vessel (12) between said stationary conductor (16) and said grounding conductor (17) so as to permit rotation thereof around a pivotal shaft (35) therefor to perform opening and closing operations thereof with respect to said stationary conductor (16) and said grounding conductor (17) and one end of said movable conductor (19) is extended out of said vacuum vessel (12), wherein said movable conductor (19) takes either four positions of closing position $Y_1$, opening position $Y_2$, disconnecting position $Y_3$ and grounding position $Y_4$ or takes three positions of closing position $Y_1$, opening position $Y_2$, and grounding position $Y_4$ uninterruptedly during the movement thereof from said stationary conductor (16) to said grounding conductor (17), and further an arc extinguishing arrangement (18) which extinguishes an arc (A) generated between said stationary conductor (16) and said movable conductor (19) is provided on at least one side of said stationary conductor (16) and said movable conductor (19), said arc extinguishing arrangement (18) including a coil electrode (18E) which generates a magnetic field in a vertical direction and a main electrode (18F) which is disposed in facing relation with respect to said coil electrode (18E) and is designed to touch with the arc (A).

4. An insulated type switching device according to claim 3, wherein said arc extinguishing arrangement (18) further includes metal attachment member (18B) which is inserted into an attachment groove (18A) formed by cutting into said stationary conductor (16) from one side thereof, a screw (18C) which is provided at an opposite side of said stationary conductor (16) so as to fasten and screw said metal attachement member (18B) to said stationary conductor (16), an inclined portion of said coil electrode (18E) which is secured to said attachment metal member (18B) so that the face of said coil electrode (18E) is directed toward the rotating direction of said movable conductor (19) from said stationary conductor (16), through-holes provided for both said coil electrode (18E) and said main electrode (18F) at the center thereof, grooves extending from the outer peripheries of both said coil electrode (18E) and said main electrode (18F) and a connecting portion (18H) connecting said coil electrode (18E) with said main electrode (18F) along said grooves.

5. An insulated type switching device comprising:

a stationary conductor (16) and a grounding conductor (17) which are disposed in an opposing relation in a vacuum vessel (12) and a movable conductor (19) disposed in said vacuum (12) between said stationary conductor (16) and said grounding conductor (17) so as to permit rotation thereof around a pivotal shaft (35) therefor to perform opening and closing operations thereof with respect to said stationary conductor (16) and said grounding conductor (17) and one end of said movable conductor (19) is extended out of said vacuum vessel 12, wherein said movable conductor (19) takes either four positions of closing position $Y_1$, opening position $Y_2$, disconnecting position $Y_3$ and grounding position $Y_4$ or takes three positions of closing position $Y_1$, opening position $Y_2$, and grounding position $Y_4$ uninterruptedly during the movement thereof from said stationary conductor (16) to said grounding conductor (17), and further an arc extinguishing arrangement (102) which extinguishes an arc (A) generated between said stationary conductor (16) and said movable conductor (19) is provided at least at one side of said stationary conductor (16) and said movable conductor (19), said arc extinguishing arrangement (102) including a portion having projections and recesses (103) in said vacuum vessel (12) at the opposite side from the side where the one end of said movable conductor (19) is extended out from said vacuum vessel (12) and a pair of arc horns (100) and (101) provided at both end portions of said portions having projections and recesses (103).

6. An insulated type switching device comprising:

a stationary conductor (16) and a grounding conductor (17) which are disposed in an opposing relation in a vacuum vessel (12) and a movable conductor (19) disposed in said vacuum vessel (12) between said stationary conductor (16) and said grounding conductor (17) so as to permit rotation thereof around a pivotal shaft (35) therefor to perform opening and closing operations thereof with respect to said stationary conductor (16) and said grounding conductor (17) and one end of said movable conductor (19) is extended out of said vacuum vessel (12), wherein said movable conductor (19) takes either four positions of closing position $Y_1$, opening position $Y_2$, disconnecting position $Y_3$ and grounding position $Y_4$ or takes three positions of closing position $Y_1$, opening position $Y_2$, and grounding position $Y_4$ uninterruptedly during the movement thereof from said stationary conductor (16) to said grounding conductor (17), and further an arc extinguishing arrangement (18) which extinguishes an arc (A) generated between said stationary conductor (16) and said movable conductor (19) is provided at least at one side of said stationary conductor (16) and said movable conductor (19), said arc extinguishing arrangement (18) including a stationary contact electrode (16) with an arc guiding groove (18S) carried by said stationary conductor (16) and a movable contact electrode (19A) with an arc guiding groove (18S) carried by said movable conductor (19), whereby when said movable conductor (19) is separated from said stationary conductor (16) through rotation of said movable conductor (19) around said pivotal shaft (35), the separating distance between said stationary contact electrode (16A) and the movable contact electrode (19A) at an outer circumference thereof exceeds that between said stationary contact electrode (16A) and the movable contact electrode (19A) [at the outer circumference thereof exceeds that between said stationary contact electrode (16A) and said movable electrode (19A)] at the inner circumference thereof and *the* arc [the] at the outer circumference on said stationary and movable contact electrodes (16A) and (19A) is forced toward the inner circumference thereof.

7. An insulated type switching device comprising:

a stationary conductor (16) which is disposed in a vacuum vessel (12) and a movable conductor (19) disposed in said vacuum vessel (12) so as to permit rotation thereof around a pivotal shaft (35) therefor to perform opening and closing operations thereof with respect to said stationary conductor (16) and one end of said movable conductor (19) is extended out of said vacuum vessel (12), wherein an opposing electromagnetic force generating means (41B) is provided on at least one side of said stationary conductor (16) and said movable conductor (19) which cancels out an electromagnetic force generated at said movable conductor (19).

8. An insulated type switching device according to claim 7, wherein said opposing electromagnetic force generating means (41B) is an electromagnetic force adjusting conductor provided in a load side conductor (41A) connected to said movable conductor (19) and extended in the same direction as that of said movable conductor (19).

9. An insulated type switching device comprising:

a stationary conductor (16) which is disposed in a vacuum vessel (12) and a movable conductor (19) disposed in said vacuum vessel (12) to perform [the] opening and closing operations thereof with respect to said stationary conductor (16) wherein [said] *an* opposing electromagnetic force generating means (41B) is an electromagnetic force adjusting means provided in a load side conductor (41A) connected to said movable conductor (19) and cancels out an electromagnetic force generated at said movable conductor (19), and further an arc extinguishing arrangement (18) which extinguishes an arc (A) generated between said stationary conductor (16) and said movable conductor (18) is provided on at least one side of said stationary conductor (19) and said movable conductor (19), said arc extinguishing arrangement (18) including a stationary contact electrode (16A) with an arc guiding groove (18S) carried by said stationary conductor (16) and a movable contact electrode (19A) with an arc guiding groove (18S) carried by said movable conductor (19), whereby when said movable conductor (19) is separated from said stationary conductor (16) through rotation of said movable conductor (19) around said pivotal shaft (35), the separating distance between said stationary contact electrode (16A) and the movable contact electrode (19A) at [the] *an* outer circumference thereof exceeds that between said stationary contact electrode (16A) and said movable contact electrode (19A) at [the] *an* inner circumference thereof and the arc at the outer circumference on said stationary and movable contact electrodes (16A) and (19A) is forced toward the inner circumference thereof.

10. An insulated type switching device comprising a plurality of vacuum switches each including a stationary conductor (16) and a grounding conductor (17) which are disposed in an opposing relation to a vacuum vessel (12) and a movable conductor (19) disposed in said vacuum vessel (12) between said stationary conductor (16) and said grounding conductor (17) so as to permit rotation thereof around a pivotal shaft (35) therefor to perform opening and closing operations thereof with respect to said stationary conductor (16) and said grounding conductor (17) and one end of said movable conductor (19) is extended out of said vacuum vessel (12), wherein said plurality of the vacuum switches are arranged in parallel so that said outwardly extending movable conductors (19) are aligned in parallel at the same side of the respective vacuum switches.

11. An insulated type switching device comprising a stationary conductor (16) and a grounding conductor (17), first ends of which are disposed in an opposing relation in a vacuum vessel (12), the other ends of which are extended out of said vacuum vessel (12), and a movable conductor (19) disposed in said vacuum vessel (12) between said stationary conductor (16) and said grounding conductor (17) so as to permit rotation thereof around a pivotal shaft (35) therefor to perform the opening and closing operations thereof with respect to said stationary conductor (16) and said grounding conductor (17) and one end of said movable conductor (19) is extended out of said vacuum vessel (12), wherein the other end of said grounding conductor (17) is bent in an opposite direction from said movable conductor (19) to form an external grounding terminal (32).

*12. An insulated type switching device comprising:*

*a stationary conductor and a grounding conductor which are disposed in an operational relation in a vacuum vessel and a movable conductor disposed in said vacuum vessel between said stationary conductor and said grounding conductor so as to permit movement thereof around a pivotal shaft therefor to perform opening and closing operations thereof with respect to said stationary conductor and said grounding conductor, and one end of said movable conductor is extended out of said vacuum vessel, wherein said movable conductor takes four positions of closing position $Y_1$, opening position $Y_2$, disconnecting position $Y_3$ and grounding position $Y_4$ during the movement thereof from said stationary conductor to said grounding conductor.*

*13. An insulated type switching device comprising:*

*a stationary conductor and a grounding conductor, which are disposed in an operational relation in a vacuum vessel and a movable conductor disposed in said vacuum vessel between said stationary conductor and said grounding conductor so as to permit movement thereof around a pivotal shaft to perform opening and closing operations thereof with respect to said stationary conductor and said grounding conductor, and one end of said movable conductor being extended out of said vacuum vessel, wherein said movable conductor takes three positions of closing position $Y_1$, opening position $Y_2$, and grounding position $Y_4$ during the movement thereof from said stationary conductor to said grounding conductor.*

*14. An insulated type switching device, comprising:*

*a stationary conductor and a grounding conductor which are disposed in an opposing relation in a vacuum vessel and a movable conductor disposed in said vacuum vessel between said stationary conductor and said grounding conductor so as to permit movement thereof around a pivotal shaft therefor to perform opening and closing operations thereof with respect to said stationary conductor and said grounding conductor and one end of said movable conductor is extended out of said vacuum vessel, wherein said movable conductor takes either four positions of closing position $Y_1$, opening position $Y_2$, disconnecting position $Y_3$ and grounding position $Y_4$ or takes three positions of closing position*

*$Y_1$, opening position $Y_2$, and grounding position $Y_4$ during the movement thereof from said stationary conductor to said grounding conductor, and further an arc extinguishing arrangement which extinguishes an arc (A) generated between said stationary conductor and said movable conductor is provided on at least one side of said stationary conductor and said movable conductor, said arc extinguishing arrangement including a coil electrode which generates a magnetic field in a vertical direction and a main electrode which is disposed in facing relation with respect to said coil electrode and is designed to touch with the arc (A).*

*15. An insulated type switching device according to claim 14, wherein said arc extinguishing arrangement further includes metal attachment member which is inserted into an attachment groove formed by cutting into said stationary conductor from one side thereof, a screw which is provided at an opposite side of said stationary conductor so as to fasten and screw said metal attachment ember to said stationary conductor, an included portion of said coil electrode which is secured to said attachment metal member so that the face of said coil electrode is directed toward the rotating direction of said movable conductor from said stationary conductor, through-holes provided for both said coil electrode and said main electrode at the center thereof, grooves extending from the outer peripheries of both said coil electrode and said main electrode and a connecting portion connecting said coil electrode with said main electrode along said grooves.*

*16. An insulated type switching device comprising:*

*a stationary conductor and a grounding conductor which are disposed in an opposing relation in a vacuum vessel and a movable conductor disposed in said vacuum vessel between said stationary conductor and said grounding conductor so as to permit movement thereof around a pivotal shaft therefor to perform opening and closing operations thereof with respect to said stationary conductor and said grounding conductor, and one end of said movable conductor is extended out of said vacuum vessel, wherein said movable conductor takes either four positions of closing position $Y_1$, opening position $Y_2$, disconnecting position $Y_3$ and grounding position $Y_4$ or takes three positions of closing position $Y_1$, opening position $Y_2$, and grounding position $Y_4$ during the movement thereof from said stationary conductor to said grounding conductor, and further an arc extinguishing arrangement which extinguishes an arc (A) generated between said stationary conductor and said movable conductor is provided at least at one side of said stationary conductor and said movable conductor, said arc extinguishing arrangement including a portion having projections and recesses in said vacuum vessel at the opposite side from the side where the one end of said movable conductor is extended out from said vacuum vessel and a pair of arc horns and provided at both end portions of said portion having projections and recesses.*

*17. An insulated type switching device comprising:*

*a stationary conductor and a grounding conductor which are disposed in an opposing relation in a vacuum vessel and a movable conductor disposed in said vacuum vessel between said stationary conductor and said grounding conductor so as to permit movement thereof around a pivotal shaft therefor to perform opening and closing operations thereof with respect to said stationary conductor and said grounding conductor and one end of said movable conductor is extended out of said vacuum vessel, wherein said movable conductor takes either four positions of closing position $Y_1$, opening position $Y_2$, disconnecting position $Y_3$ and grounding position $Y_4$ or takes three positions of closing position $Y_1$, opening position $Y_2$, and grounding position $Y_4$ during the movement thereof from said stationary conductor to said grounding conductor, and further an arc extinguishing arrangement which extinguishes an arc (A) generated between said stationary conductor and said movable conductor is provided at least at one side of said stationary conductor and said movable conductor, said arc extinguishing arrangement including a stationary contact electrode with an arc guiding groove carried by said stationary conductor and a movable contact electrode with an arc guiding groove carried by said movable conductor, whereby when said movable conductor is separated from said stationary conductor through rotation of said movable conductor around said pivotal shaft, the separating distance between said stationary contact electrode and the movable contact electrode at an outer circumference thereof exceeds that between said stationary contact electrode and the movable contact electrode at the inner circumference thereof and the arc at the outer circumference on said stationary and movable contact electrodes is forced toward the inner circumference thereof.*

*18. An insulated type switching device comprising:*

*a stationary conductor which is disposed in a vacuum vessel and a movable conductor disposed in said vacuum vessel so as to permit movement thereof around a pivotal shaft therefor to perform opening and closing operations thereof with respect to said stationary conductor and one end of said movable conductor is extended out of said vacuum vessel, wherein an opposing electromagnetic force generating means is provided on at least one side of said stationary conductor and said movable conductor which cancels out an electromagnetic force generated at said movable conductor.*

*19. An insulated type switching device according to claim 18, wherein said opposing electromagnetic force generating means is an electromagnetic force adjusting conductor provided in a load side conductor connected to said movable conductor and extended in the same direction as that of said movable conductor.*

*20. An insulated type switching device comprising:*

*a stationary conductor which is disposed in a vacuum vessel and a movable conductor disposed in said vacuum vessel to perform opening and closing operations thereof with respect to said stationary conductor wherein an opposing electromagnetic force generating means is an electromagnetic force adjusting means provided in a load side conductor connected to said movable conductor and cancels out an electromagnetic force generated at said movable conductor, and further an arc extinguishing arrangement which extinguishes an arc (A) generated between said stationary conductor and said movable conductor is provided on at least one side of said stationary conductor and said movable conductor, said arc extinguishing arrangement including a stationary contact electrode with an arc guiding groove carried by said stationary conductor and a movable contact electrode with an arc guiding groove carried by said movable conductor, whereby when said movable conductor is separated from said stationary conductor through movement of said movable conductor around said pivotal shaft, the separating distance*

*between said stationary contact electrode and the movable contact electrode at an outer circumference thereof exceeds that between said stationary contact electrode and said movable contact electrode at an inner circumference thereof and the arc at the outer circumference on said stationary and movable contact electrodes is forced toward the inner circumference thereof.*

*21. An insulated type switching device comprising a plurality of vacuum switches each including a stationary conductor and a grounding conductor which are disposed in an operational relation in a vacuum vessel and a movable conductor disposed in said vacuum vessel between said stationary conductor and said grounding conductor so as to permit movement thereof around a pivotal shaft therefor to perform opening and closing operations thereof with respect to said stationary conductor and said grounding conductor and one end of said movable conductor is extended out of said vacuum vessel, wherein said plurality of the vacuum switches are arranged in parallel so that said outwardly extending movable conductors are aligned in parallel at the same side of the respective vacuum switches.*

*22. An insulated type switching device comprising a stationary conductor and a grounding conductor, first ends of which are disposed in an operational relation in a vacuum vessel, the other ends of which are extended out of said vacuum vessel, and a movable conductor disposed in said vacuum vessel between said stationary conductor and said grounding conductor so as to permit movement thereof around a pivotal shaft therefor to perform the opening and closing operations thereof with respect to said stationary conductor and said grounding conductor and one end of said movable conductor is extended out of said vacuum vessel, wherein the other end of said grounding conductor is bent in an opposite direction from said movable conductor to form an external grounding terminal.*

*23. An insulated type switching device comprising:*

*a vacuum vessel;*

*a stationary conductor, disposed in the vacuum vessel;*

*a grounding conductor, disposed in the vacuum vessel; and*

*a movable conductor, disposed in the vacuum vessel, one end of which moves between the stationary conductor and the grounding conductor, when an operating mechanism coupled to the other end of the movable conductor operates the movable conductor;*

*wherein the operating mechanism is designed to move the movable conductor so as to take at least three of four positions $Y_1$, $Y_2$, $Y_3$ and $Y_4$ between the stationary conductor and the grounding conductor, wherein $Y_1$ is a position making contact between the stationary conductor and the one end of the movable conductor, $Y_2$ is a position making a separation between the stationary conductor and the one end of the movable conductor thereby to extinguish an arc generated between the stationary conductor and the movable conductor, $Y_3$ is a position making a disconnection between the stationary conductor and the movable conductor thereby to maintain a dielectric distance therebetween, and $Y_4$ is a position making contact between the one end of the movable conductor and the grounding conductor.*

*24. A vacuum switching device comprising:*

*a vacuum vessel;*

*a stationary conductor, disposed in the vacuum vessel;*

*a grounding conductor, disposed in the vacuum vessel; and*

*a movable conductor, disposed in the vacuum vessel, one end of which moves between the stationary conductor and the grounding conductor, when an operating mechanism coupled to the other end of the movable conductor operates the movable conductor, the other end of the movable conductor being extended outside of the vacuum vessel;*

*wherein the operating mechanism is designed to move the movable conductor so as to take at least three of four positions $Y_1$, $Y_2$, $Y_3$ and $Y_4$ between the conductors, where $Y_1$ is a position making contact between the stationary conductor and the one end of the movable conductor, $Y_2$ is a position making a separation between the stationary conductor and the one end of the movable conductor, $Y_3$ is a position making a disconnection between the stationary conductor and the movable conductor thereby to maintain a dielectric distance therebetween, and $Y_4$ is a position making contact between the one end of the movable conductor and the grounding conductor.*

*25. An insulated type switching device comprising:*

*an insulation container confining an insulating gas therein; and a vacuum vessel wherein a stationary conductor; a grounding conductor; and a movable conductor, one end of which moves between the stationary conductor and the grounding conductor when an operating mechanism coupled to the other end of the movable conductor operates the movable conductor, are disposed;*

*and wherein the operating mechanism moves the movable conductor so as to take at least three of four positions $Y_1$, $Y_2$, $Y_3$ and $Y_4$ between the stationary conductor and the grounding conductor, wherein $Y_1$ is a position making contact between the stationary conductor and the one end of the movable conductor, $Y_2$ is a position making a separation between the stationary conductor and the one end of the movable conductor thereby to extinguish an arc generated between the conductors, $Y_3$ is a position making a disconnection between the stationary conductor and the movable conductor thereby to maintain a dielectric distance therebetween, and $Y_4$ is a position making contact between the one end of the movable conductor and the grounding conductor.*

*26. A switching device, which comprises:*

*an insulation container confining an insulation gas therein for receiving a plurality of switching devices, each comprising a vacuum vessel wherein a stationary conductor; a grounding conductor; and a movable conductor, one end of which moves between the stationary conductor and the grounding conductor, when an operating mechanism coupled to the other end of the movable conductor operates the movable conductor, are disposed;*

*and wherein the operating mechanism moves the movable conductor so as to take four positions $Y_1$, $Y_2$, $Y_3$ and $Y_4$ between the stationary conductor and the grounding conductor, wherein $Y_1$ makes contact between the stationary conductor and the one end of the movable conductor, $Y_2$ makes a separation between the stationary conductor and the one end of the movable conductor thereby to extinguish an arc generated between the stationary conductor and the movable conductor, $Y_3$ makes a disconnection between the stationary conductor and the movable conductor thereby to maintain a dielectric distance therebetween, and $Y_4$ makes contact between the one end of the movable conductor and the grounding conductor.*

*27. An insulated type switching device, which comprises:*

*an insulation container confining an insulation gas therein; and a plurality of switching devices received in*

*the insulation container, each comprising a vacuum vessel wherein a stationary conductor; a grounding conductor; and a movable conductor, one end of which moves between the stationary conductor and the grounding conductor, when an operating mechanism coupled to the other end of the movable conductor operates the movable conductor, are disposed; and*

*wherein the operating mechanism is designed to actuate the movable conductor so as to take four positions $Y_1$, $Y_2$, $Y_3$ and $Y_4$ between the stationary conductor and the grounding conductor, wherein $Y_1$ makes contact between the stationary conductor and the one end of the movable conductor, $Y_2$ makes a separation between the stationary conductor and the one end of the movable conductors, $Y_3$ makes a disconnection between the stationary conductor and the movable conductor thereby to maintain a dielectric distance therebetween, and $Y_4$ makes contact between the one end of the movable conductor and the grounding conductor.*

*28. An insulated type switching device comprising:*

*a vacuum vessel;*

*a stationary conductor disposed in the vacuum vessel;*

*a grounding conductor, disposed in the vacuum vessel;*

*a movable conductor, disposed in the vacuum vessel, one end of which moves between the stationary conductor and the grounding conductor, when an operating mechanism coupled to the other end of the movable conductor operates the movable conductor; and*

*wherein the operating mechanism is designed to actuate the other end of the movable conductor so as to take at least three positions $Y_1$, $Y_2$, and $Y_4$ between the conductors, where $Y_1$ makes contact between the stationary conductor and the one end of the movable conductor, $Y_2$ makes a separation between the stationary conductor and the one end of the movable conductor thereby to extinguish an arc generated between the stationary conductor and the movable conductor, and $Y_4$ makes contact between the one end of the movable conductor and the grounding conductor.*

*29. An insulated type switching device, which comprises:*

*an insulation container confining an insulating gas therein; and a plurality of switching devices received in the insulation container, each comprising a vacuum vessel wherein a stationary conductor; a grounding conductor; and a movable conductor, one end of which moves between the stationary conductor and the grounding conductor, when an operating mechanism coupled to the other end of the movable conductor operates the movable conductor, are disposed; and*

*wherein the operating mechanism is designed to actuate the movable conductor so as to take at least three positions $Y_1$, $Y_2$, and $Y_4$ between the stationary conductor and the grounding conductor, wherein $Y_1$ makes contact between the stationary conductor and the one end of the movable conductor, $Y_2$ makes a separation between the stationary conductor and the one end of the movable conductor, and $Y_4$ makes contact between the one end of the movable conductor and the grounding conductor.*

* * * * *